(12) United States Patent
Ohira et al.

(10) Patent No.: US 11,402,678 B2
(45) Date of Patent: Aug. 2, 2022

(54) DISPLAY DEVICE

(71) Applicant: Japan Display Inc., Tokyo (JP)

(72) Inventors: Hirofumi Ohira, Tokyo (JP); Koji Yoshida, Tokyo (JP); Soichiro Ohama, Tokyo (JP); Toshihiko Tanaka, Tokyo (JP)

(73) Assignee: Japan Display Inc., Tokyo (JP)

( * ) Notice: Subject to any disclaimer, the term of this patent is extended or adjusted under 35 U.S.C. 154(b) by 168 days.

(21) Appl. No.: 17/009,362

(22) Filed: Sep. 1, 2020

(65) Prior Publication Data

US 2021/0063795 A1   Mar. 4, 2021

(30) Foreign Application Priority Data

Sep. 2, 2019 (JP) .............................. JP2019-159318

(51) Int. Cl.
| | | |
|---|---|---|
| G02F 1/133 | (2006.01) |
| G02F 1/1333 | (2006.01) |
| G02F 1/1343 | (2006.01) |
| G02F 1/1335 | (2006.01) |
| G02B 27/01 | (2006.01) |
| G01K 7/16 | (2006.01) |
| G01J 1/42 | (2006.01) |
| G01K 1/02 | (2021.01) |

(52) U.S. Cl.
CPC ............ *G02F 1/13306* (2013.01); *G01J 1/42* (2013.01); *G01K 1/026* (2013.01); *G01K 7/16* (2013.01); *G02B 27/0101* (2013.01); *G02F 1/133345* (2013.01); *G02F 1/133512* (2013.01); *G02F 1/134363* (2013.01); *G02F 1/13312* (2021.01); *G02F 1/133514* (2013.01); *G02F 1/134372* (2021.01)

(58) Field of Classification Search
CPC .................................................. G02F 1/13306
See application file for complete search history.

(56) References Cited

U.S. PATENT DOCUMENTS

2016/0126257 A1\*  5/2016  Cao ........................ G02F 1/1368
                                                                           257/72
2016/0306169 A1   10/2016  Nambara
2020/0028021 A1\*   1/2020  Lee .................. H01L 31/022408

FOREIGN PATENT DOCUMENTS

JP        2015-210328 A     11/2015
JP        2016-051090 A      4/2016

\* cited by examiner

*Primary Examiner* — Edmond C Lau
(74) *Attorney, Agent, or Firm* — K&L Gates LLP

(57) ABSTRACT

A display device comprising: a substrate having a display region; a plurality of temperature detection wires arranged at positions overlapping with the display region in plan view; and a light detection electrode overlapping with temperature detection regions of the temperature detection wires in plan view.

10 Claims, 11 Drawing Sheets

DISPLAY DEVICE

CROSS-REFERENCE TO RELATED APPLICATIONS

This application claims priority from Japanese Application No. 2019-159318, filed on Sep. 2, 2019, the contents of which are incorporated by reference herein in its entirety.

BACKGROUND

1. Technical Field

The present disclosure relates to a display device.

2. Description of the Related Art

What-are-called head-up displays (HUDs) that project an image onto a member having translucency, such as glass, have been known (for example, Japanese Patent Application Laid-open Publication No. 2015-210328 (JP-A-2015-210328).

As described in the technique in JP-A-2015-210328, sunlight can be incident on a display device through an optical system. When the display device is exposed to the sunlight condensed by the optical system, the display device can be deteriorated.

Japanese Patent Application Laid-open Publication No. 2016-051090 (JP-A-2016-051090) describes a liquid crystal display device in which a temperature sensor is arranged outside a display region. At a position of the temperature sensor as in JP-A-2016-051090, temperature increase due to sunlight condensed by an optical system and temperature increase of a surrounding environment cannot be distinguished from each other.

SUMMARY

An object of the present disclosure is to provide a display device capable of detecting a partial heat generation state of a display region due to external light condensed by an optical system.

To solve the above-described problems and achieve the object, a display device according to an aspect of the present disclosure includes a substrate having a display region, a plurality of temperature detection wires arranged at positions overlapping with the display region in plan view, and a light detection electrode overlapping with a temperature detection region of the temperature detection wire in plan view.

DETAILED DESCRIPTION

Figure 1:
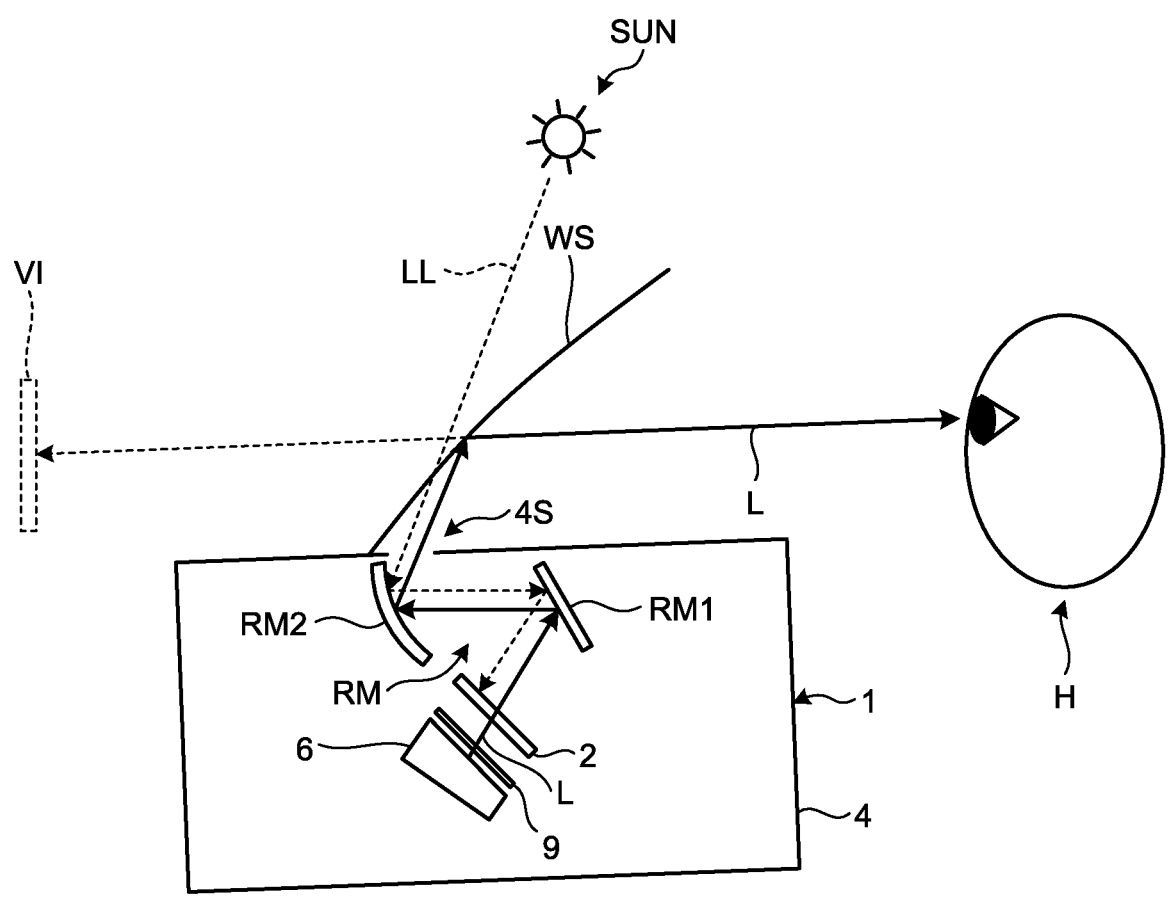
FIG. 1 is a descriptive view for schematically explaining a head-up display.

Modes (embodiments) for carrying out the present disclosure will be described in detail with reference to the drawings. Contents described in the following embodiments do not limit the present disclosure. Components described below include those that can be easily assumed by those skilled in the art and substantially the same components. Furthermore, the components described below can be appropriately combined. The disclosure is merely an example and it is needless to say that appropriate modifications within the gist of the disclosure at which those skilled in the art can easily arrive are encompassed in the range of the present disclosure. In the drawings, widths, thicknesses, shapes, and the like of the components can be schematically illustrated in comparison with actual modes for a clearer explanation. They are, however, merely examples and do not limit interpretation of the present disclosure. In the present specification and the drawings, the same reference numerals denote components similar to those described before with reference to the drawings that have been already referred to, and detail explanation thereof can be appropriately omitted.

First Embodiment

FIG. 1 is a descriptive view for schematically explaining a head-up display. A head-up display (hereinafter, referred to as an HUD) device 1 includes a backlight 6, a diffusion plate 9, a display device 2, a window shield WS, and an optical system RM that enlarges an image from the display device 2 and projects it onto the window shield WS.

A housing 4 accommodates therein the backlight 6 functioning as a light source device, the display device 2 outputting an image using light L from the backlight 6 as a light source, the diffusion plate 9 provided between the display device 2 and the backlight 6, and the optical system RM. A part or all of the light L emitted from the backlight 6 passes through the display device 2 after being diffused by the diffusion plate 9, is reflected by the optical system RM and the window shield WS, and reaches a user H to be recognized as an image VI in the field of view of the user H. That is to say, the display device 2 in the first embodiment functions as the head-up display (HUD) device 1 using the optical system RM and the window shield WS. It is sufficient that the window shield WS is a member having translucency located on a line of sight of the user H, and the window shield WS may be, for example, a window screen of a vehicle.

The HUD device 1 in the first embodiment guides the light L after passing through the display device 2 by the optical system RM including a mirror member RM1 and a mirror member RM2. The mirror member RM1 is a plane mirror and the mirror member RM2 is a concave mirror. The mirror member RM1 may be a concave mirror. The optical system RM is not limited thereto, and the optical system RM may include one mirror member or three or more mirror members.

Figure 2:
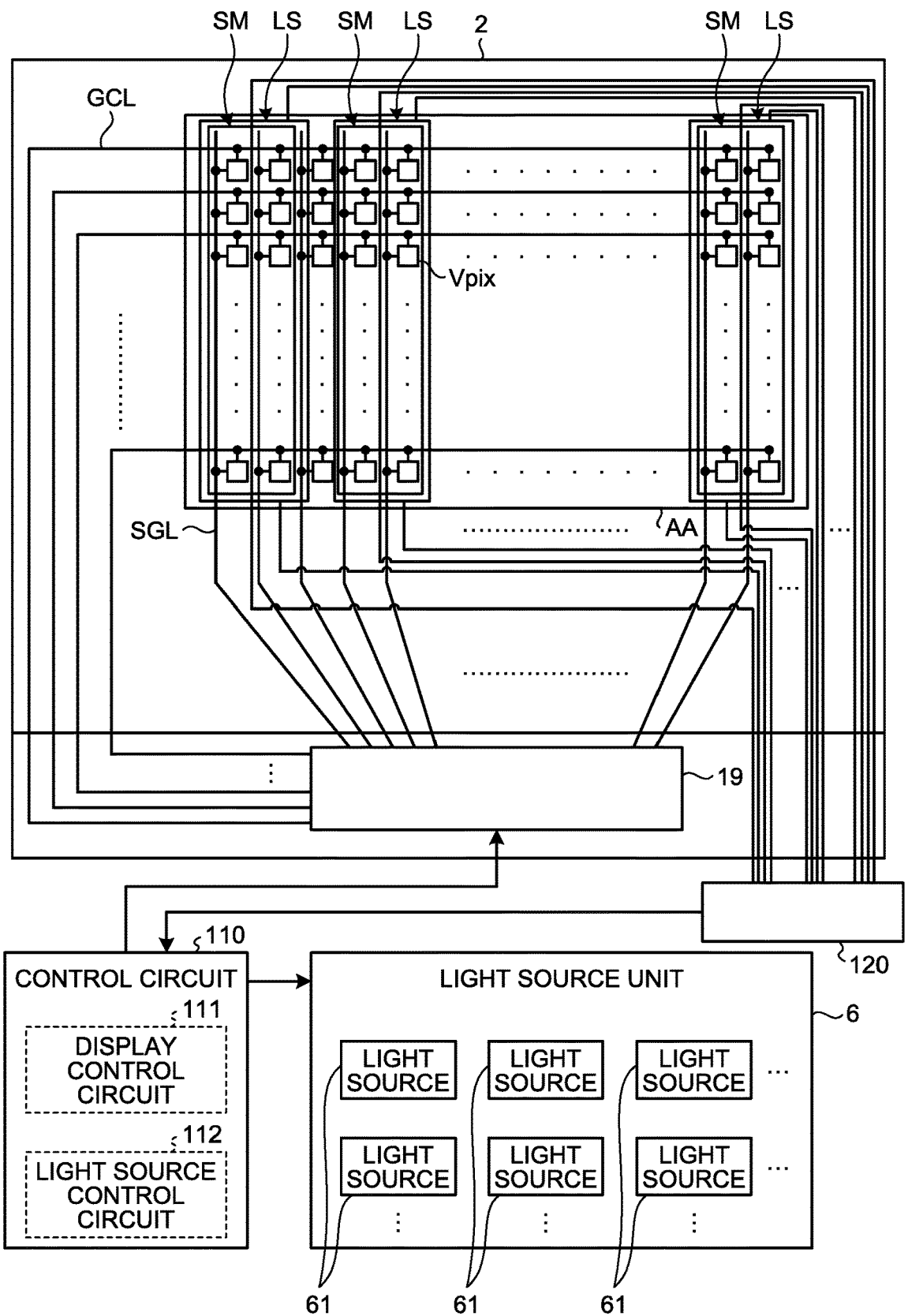
FIG. 2 is a descriptive view for schematically explaining a display device.
Figure 3:
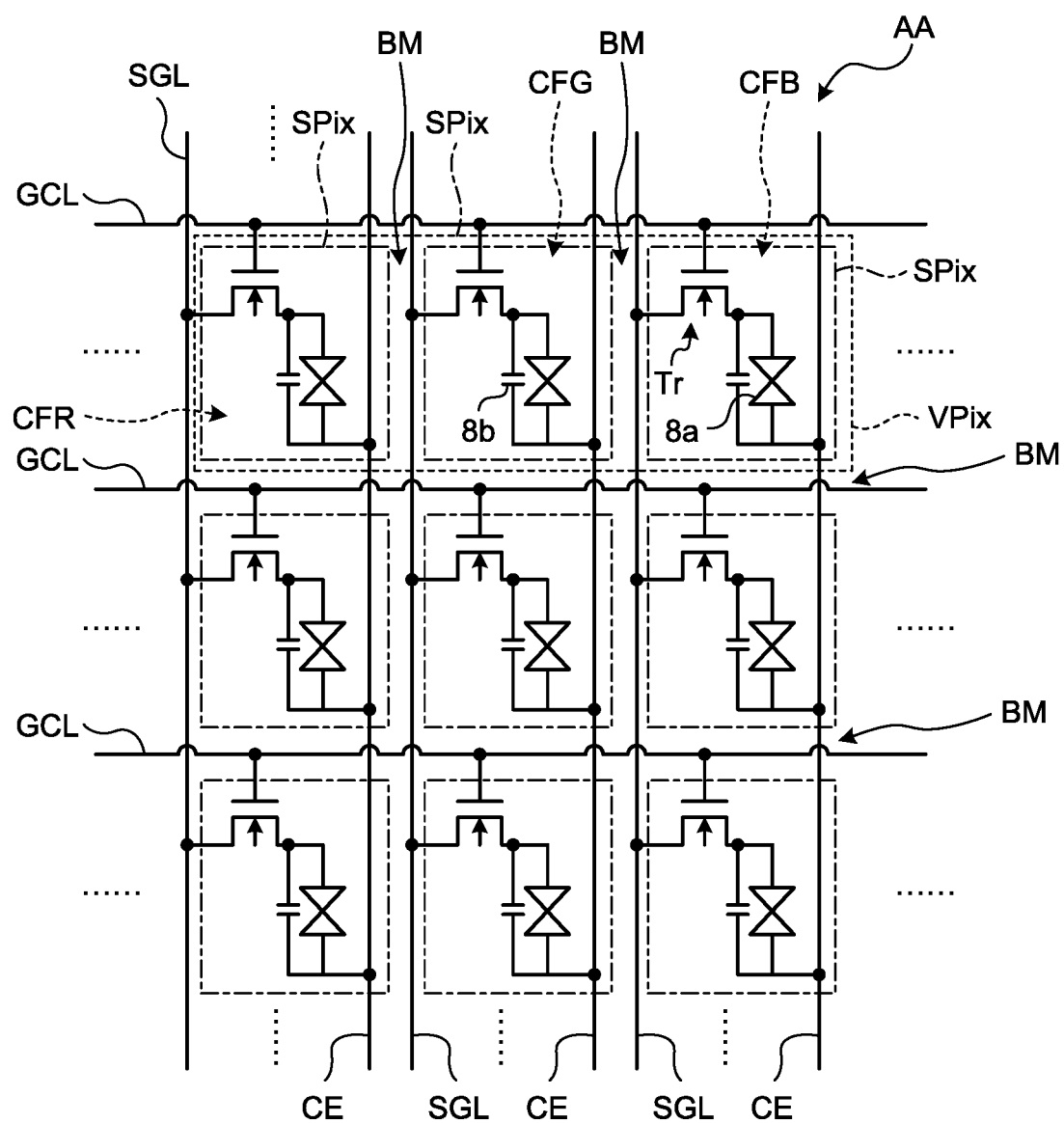
FIG. 3 is a descriptive view for explaining pixels of the display device.
Figure 4:
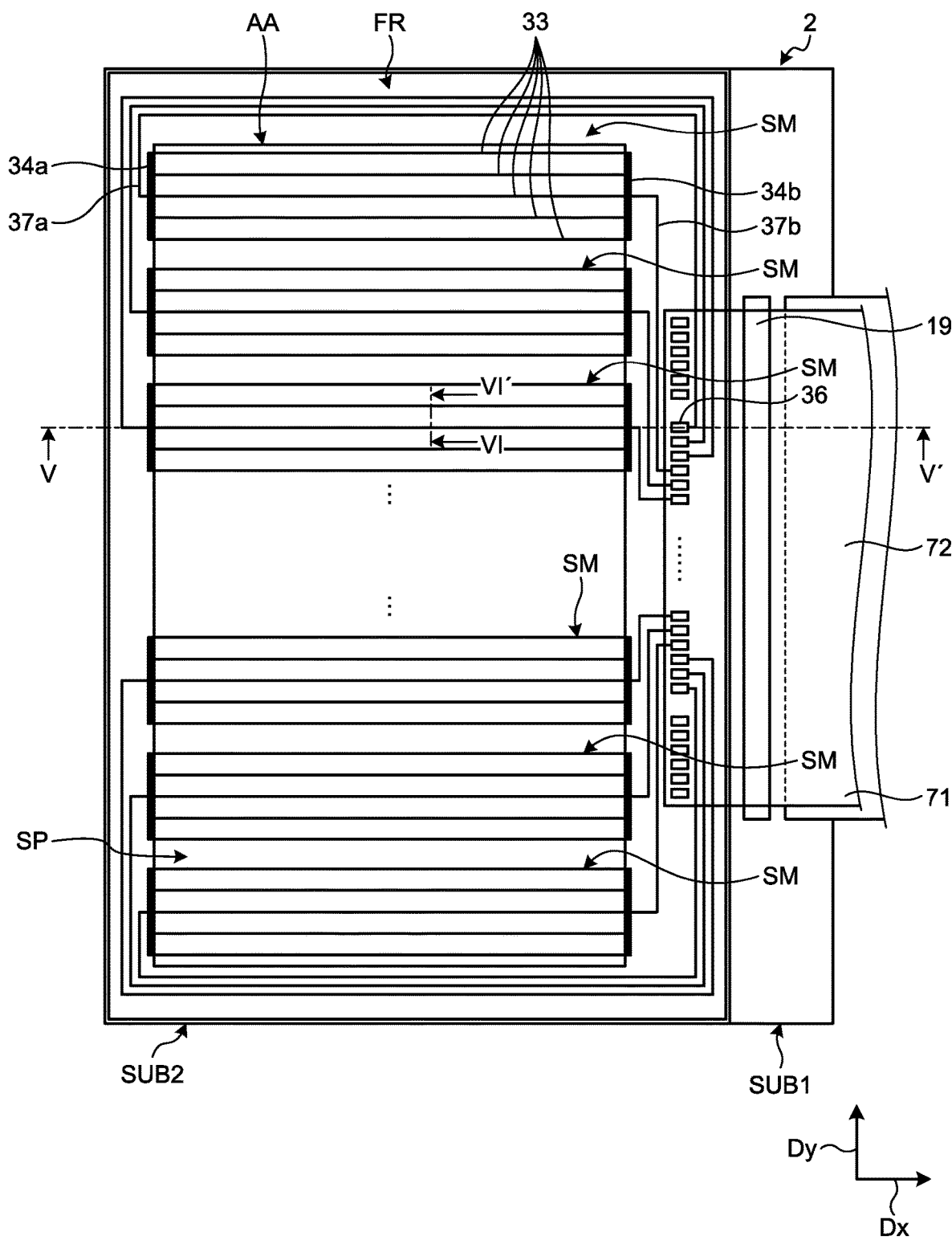
FIG. 4 is a plan view for explaining arrangement of temperature detection wires.
Figure 5:
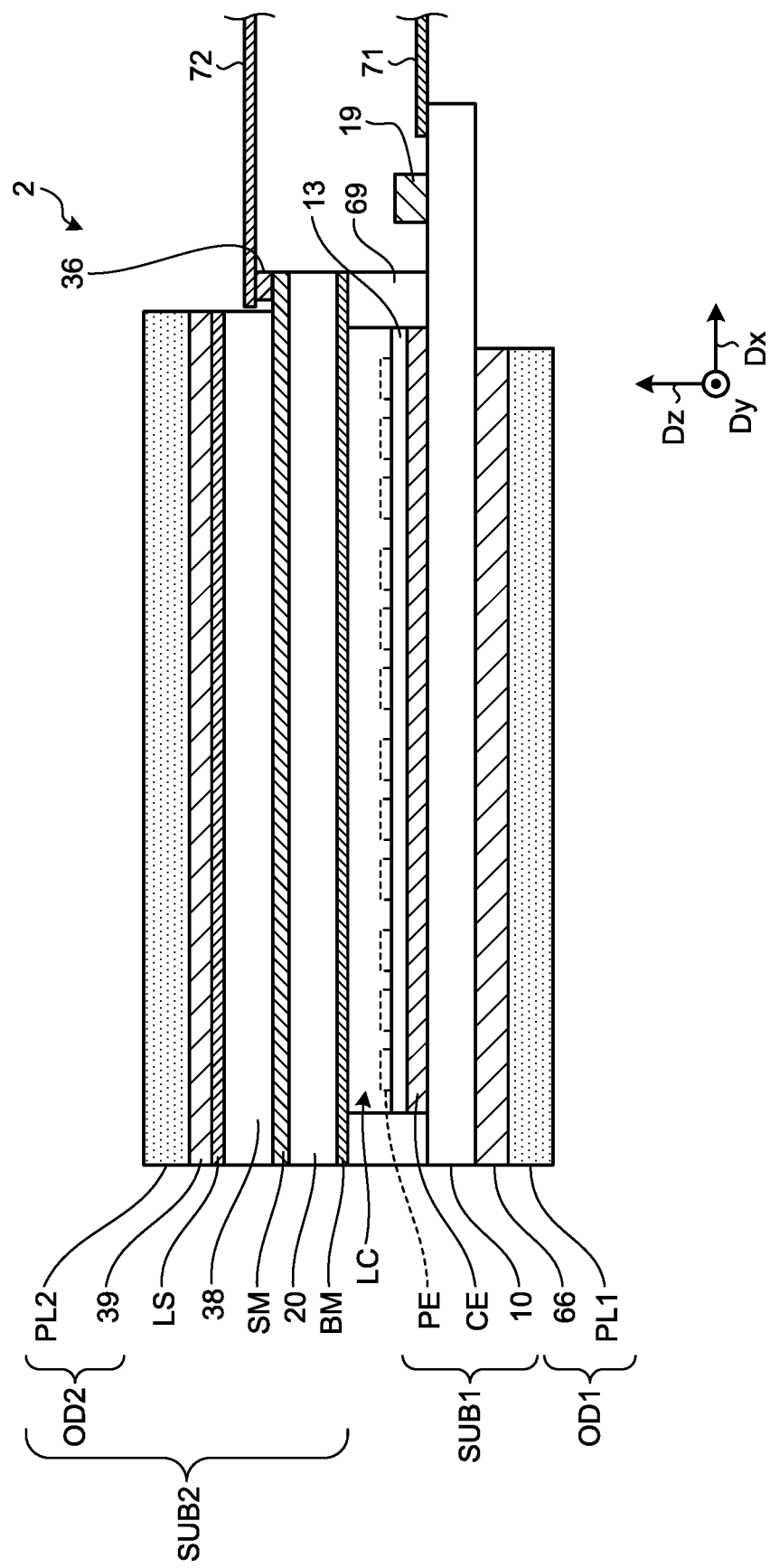
FIG. 5 is a cross-sectional view illustrating a schematic cross section taken along line V-V' of the display device illustrated in FIG. 4.
Figure 6:
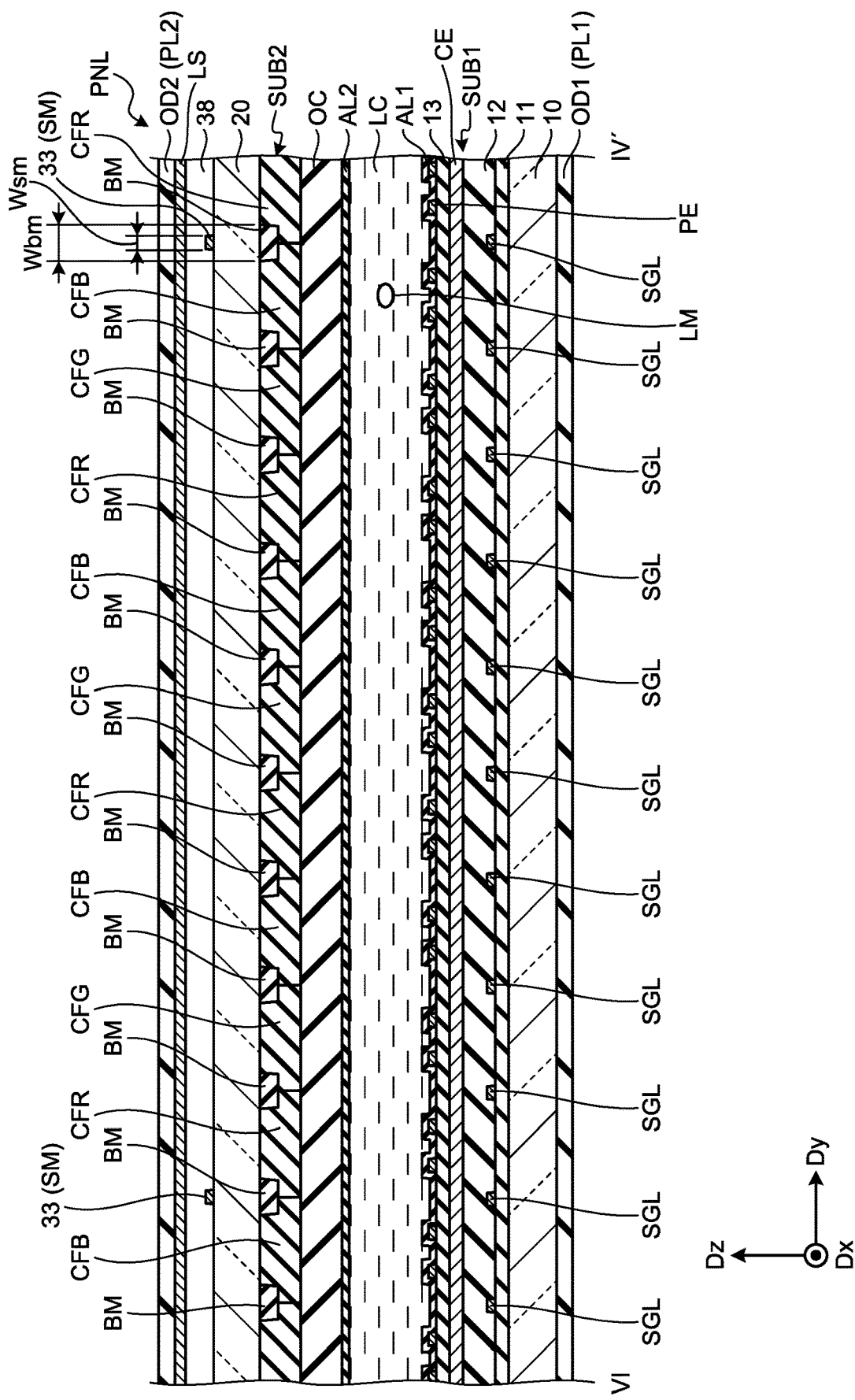
FIG. 6 is a cross-sectional view illustrating a schematic cross section taken along line VI-VI' of the display device illustrated in FIG. 4.

Next, the display device 2 is described. FIG. 2 is a descriptive view for schematically explaining the display device. FIG. 3 is a descriptive view for explaining pixels of the display device. FIG. 4 is a plan view for explaining arrangement of temperature detection wires. FIG. 5 is a cross-sectional view illustrating a schematic cross section taken along line V-V' of the display device illustrated in FIG. 4. FIG. 6 is a cross-sectional view illustrating a schematic cross section taken along line VI-VI' of the display device illustrated in FIG. 4. The display device 2 in the first embodiment is a transmissive liquid crystal display that outputs an image using the light L as the light source. The display device 2 includes a display driver integrated circuit (DDIC) 19.

The display device 2 is also referred to as a display panel. As illustrated in FIG. 2, a large number of pixels VPix are arranged in a matrix with a row-column configuration in a display region AA of the display device 2.

The pixels VPix illustrated in FIG. 3 have a plurality of subpixels SPix. Each subpixel SPix includes a switching element Tr and a liquid crystal capacitor 8a. The switching element Tr is formed by a thin film transistor (TFT) and, in this example, is formed by an n-channel metal oxide semiconductor (MOS)-type TFT. An insulating layer 24 is provided between pixel electrodes PE and a common electrode CE, and they form holding capacitors 8b illustrated in FIG. 3.

As illustrated in FIG. 2, a control circuit 110 functions as, for example, a display control circuit 111 and a light source control circuit 112. The display control circuit 111 outputs, to the DDIC 19, a master clock, a horizontal synchronization signal, a vertical synchronization signal, pixel signals, a drive instruction signal of the backlight 6, and the like. The pixel signals are, for example, signals provided by combining individual gradation values of red (R), green (G), and blue (B). The display control circuit 111 has a function of controlling output gradation values of some or all of the pixels based on light emission amounts of light sources 61 that are controlled by the light source control circuit 112. The light source control circuit 112 controls operations of the light sources 61 in synchronization with the pixel signals.

The switching elements Tr of the respective subpixels SPix, signal lines SGL, scan lines GCL, and the like illustrated in FIG. 3 are formed on a first substrate 10 (see FIG. 5). The signal lines SGL are wires for supplying the pixel signals to the pixel electrodes PE illustrated in FIG. 5. The scan lines GCL are wires for supplying drive signals for driving the switching elements Tr. The signal lines SGL and the scan lines GCL extend in a plane parallel to the surface of the first substrate 10 illustrated in FIG. 5.

As illustrated in FIG. 3, light shielding layers BM are formed along the signal lines SGL and the scan lines GCL. Although in FIG. 3, electric connection of the switching elements Tr is illustrated, the light shielding layers BM are superimposed on the switching elements Tr actually. The subpixels SPix have openings surrounded by the light shielding layers BM, and a set of color filters CFR, CFG, and CFB that are respectively colored with three colors of red (R), green (G), and blue (B) is made to correspond to the openings of the subpixels SPix illustrated in FIG. 3. A set of the subpixels SPix corresponding the color filters CFR, CFG, and CFB of three colors configures the pixel VPix. The color filters may include color regions of four or more colors.

The DDIC 19 illustrated in FIG. 2 selects, as a gate driver, the scan line GCL in order. The DDIC 19 applies a scan signal to the gates of the switching elements Tr of the subpixels Pix via the selected scan line GCL. One row (one horizontal line) of the subpixels SPix is thereby selected as a display drive target in order.

The DDIC 19 supplies, as a source driver, pixel signals to the subpixels Pix forming the selected one horizontal line via the signal lines SGL. Display is performed on these subpixels SPix on a horizontal line basis in accordance with the supplied pixel signals.

The DDIC 19 applies, as a common electrode driver, a common potential to the common electrode CE. The common potential is a direct-current (DC) voltage signal that is commonly applied to the subpixels SPix.

As described above, the DDIC 19 functions as the gate driver, the source driver, and the common electrode driver. The DDIC 19 may be configured such that the gate driver, the source driver, and the common electrode driver are separated from one another. At least one of the gate driver, the source driver, and the common electrode driver may be formed on the first substrate 10 using a thin film transistor (TFT).

As illustrated in FIG. 2, a plurality of temperature detection wires SM are arrayed. Both terminals of the temperature detection wires SM are extended and are electrically coupled to a resistance detection circuit 120. The resistance detection circuit 120 performs AD conversion on resistances of the temperature detection wires SM and outputs resistance detection signals to the control circuit 110.

As illustrated in FIG. 2, a plurality of light detection electrodes LS are arrayed. Both terminals of the light detection electrodes LS are extended and are electrically coupled to the resistance detection circuit 120. The resistance detection circuit 120 performs AD conversion on resistances of the light detection electrodes LS and outputs resistance detection signals to the control circuit 110.

In the first embodiment, a detection region in which one temperature detection wire SM is arranged and a detection region in which one light detection electrode LS is arranged overlap with each other in plan view.

Next, details of the configuration example of the display device 2 in the first embodiment are described. As illustrated in FIG. 5, the display device 2 includes an array substrate SUB1, a counter substrate SUB2, and a liquid crystal layer LC as a display function layer. The counter substrate SUB2 is arranged so as to face the surface of the array substrate SUB1 in the vertical direction. The liquid crystal layer LC is provided between the array substrate SUB1 and the counter substrate SUB2.

In the first embodiment, the direction toward a second substrate 20 of the counter substrate SUB2 from the first substrate 10 in the direction perpendicular to the surface of the first substrate 10 of the counter substrate SUB2 is an "upward direction". The direction toward the first substrate 10 from the second substrate 20 is a "downward direction".

The array substrate SUB1 includes the first substrate 10, the pixel electrodes PE, the common electrode CE, and a polarizing plate PL1. The switching elements Tr such as thin film transistors (TFTs) and various types of wiring (not illustrated in FIG. 5) such as the scan lines GCL and the signal lines SGL are provided on the first substrate 10.

The common electrode CE is provided above the first substrate 10. The pixel electrodes PE are provided above the common electrode CE with the insulating layer 24 interposed therebetween. The pixel electrodes PE are provided in a different layer from the common electrode CE and are arranged so as to be superimposed on the common electrode CE in plan view. The pixel electrodes PE are arranged in a matrix with a row-column configuration in plan view. The polarizing plate PL1 is provided under the first substrate 10 with an adhesive layer 66 interposed therebetween. The pixel electrodes PE and the common electrode CE are made of, for example, a conductive material having translucency, such as indium tin oxide (ITO). Although the first embodiment describes the example in which the pixel electrodes PE are provided above the common electrode CE, the common electrode CE may be provided above the pixel electrodes PE.

The DDIC 19 and a flexible substrate 71 are provided on the first substrate 10. The DDIC 19 functions as the control circuit 110 illustrated in FIG. 1.

The counter substrate SUB2 includes the second substrate 20, the light shielding layers BM formed on one surface of the second substrate 20, the light detection electrodes LS provided on the other surface of the second substrate 20, the temperature detection wires SM, a protection layer 38, an adhesive layer 39, and a polarizing plate PL2. As illustrated in FIG. 6, the color filters CFR, CFG, and CFB are also formed on one surface of the second substrate 20 similarly to the light shielding layers BM.

As illustrated in FIG. 4, the temperature detection wires SM are arrayed on the second substrate 20. As illustrated in FIG. 5, a flexible substrate 72 is coupled to the second substrate 20. The temperature detection wires SM are electrically coupled to the flexible substrate 72 with terminal portions 36 interposed therebetween. The flexible substrate 71 is coupled to the resistance detection circuit 120 illustrated in FIG. 2. The detail configuration of the temperature detection wires SM will be described later.

The protection layer 38 is an insulating layer for protecting the temperature detection wires SM. The protection layer 38 can be made of translucent resin such as acrylic resin. The light detection electrodes LS are formed on the protection layer 38. In other words, the temperature detection wires SM and the light detection electrodes LS are provided above a second substrate 31, and the temperature detection wires SM are stacked below the light detection electrodes LS. The protection layer 38 electrically insulates the light detection electrodes LS and the temperature detection wires SM from each other.

The light detection electrodes LS are made of a material having translucency and conductivity. The light detection electrodes LS are made of, for example, ITO, indium zinc oxide (IZO), SnO, or an organic conductive film. The light detection electrodes LS may be formed by an oxide film containing tin oxide ($SnO_2$) and silicon dioxide (Sift) as main components, an oxide layer containing gallium oxide ($Ga_2O_3$), indium oxide ($In_2O_3$), and tin oxide ($SnO_2$) as main components, or a translucent conductive layer made of ITO as a main material and containing silicon (Si). As illustrated in FIG. 5, the polarizing plate PL2 is provided on the light detection electrodes LS with the adhesive layer 39 interposed therebetween.

A first optical device OD1 including the polarizing plate PL1 is arranged on the outer surface of the first substrate 10 or on the surface thereof facing the backlight 6 (see FIG. 2). A second optical device OD2 including the polarizing plate PL2 is arranged on the outer surface of the second substrate 20 or on the surface thereof on an observation position side. A first polarization axis of the polarizing plate PL1 and a second polarization axis of the polarizing plate PL2 have a crossed Nicol positional relation in plan view. The first optical device OD1 and the second optical device OD2 may include another optical layer such as a retardation plate.

The first substrate 10 and the second substrate 20 are arranged with a predetermined interval. A space between the first substrate 10 and the second substrate 20 is sealed by a seal portion 69. The liquid crystal layer LC is provided in a space surrounded by the first substrate 10, the second substrate 20, and the seal portion 69. The liquid crystal layer LC modulates light that passes therethrough in accordance with an electric field state, and liquid crystal in a transverse electric field mode such as in-plane switching (IPS) including fringe field switching (FFS) is used therefor. Orientation layers (not illustrated) are respectively arranged between the liquid crystal layer LC and the array substrate SUB1 and between the liquid crystal layer LC and the counter substrate SUB2 illustrated in FIG. 5. In the first embodiment, the liquid crystal layer LC is driven with a transverse electric field that is generated between the pixel electrodes PE and the common electrode CE.

The backlight 6 illustrated in FIG. 1 and FIG. 2 is provided under the first substrate 10. The light from the backlight 6 passes through the array substrate SUB1 and is modulated in accordance with the liquid crystal state at the corresponding position. A transmission state of the light to a display surface changes depending on places. An image is thereby displayed in the display region AA of the display device 2.

Next, the cross section along line VI-VI' illustrated in FIG. 4 will be described in detail. In FIG. 6, the array substrate SUB1 includes, as a base body, the first substrate 10 having translucency and an insulating property, such as a glass substrate and a resin substrate. The array substrate SUB1 includes a first insulating layer 11, a second insulating layer 12, a third insulating layer 13, the signal lines SGL, the pixel electrodes PE, the common electrode CE, and a first orientation film AL1 on the side of the first substrate 10 that faces the counter substrate SUB2.

Although not observed in the cross section of FIG. 6, the scan lines GCL and gate electrodes of the switching elements Tr (see FIG. 4) are provided on the first substrate 10, and the first insulating layer 11 illustrated in FIG. 6 covers the scan lines GCL and the gate electrodes GE (see FIG. 4). An insulating layer made of an inorganic material having translucency, such as silicon oxide and silicon nitride, may be formed under the first insulating layer 11, the scan lines GCL, and the gate electrodes.

Although not observed in the cross section of FIG. 6, a semiconductor layer of the switching elements Tr (see FIG. 4) is stacked on the first insulating layer 11. The semiconductor layer is made of, for example, amorphous silicon but may be made of polysilicon or an oxide semiconductor.

As illustrated in FIG. 6, the second insulating layer 12 covers the signal lines SGL. The second insulating layer 12 is made of a resin material having translucency, such as acrylic resin, and has a film thickness that is larger than those of the other insulating films made of the inorganic material. It should be noted that the second insulating layer 12 may be made of an inorganic material.

Although not observed in the cross section of FIG. 6, source electrodes of the switching elements Tr (see FIG. 4) covering parts of the semiconductor layer and drain electrodes of the switching elements Tr (see FIG. 4) covering parts of the semiconductor layer are provided on the second insulating layer 12. The drain electrodes are made of the same material as that of the signal lines SGL. The third insulating layer 13 is provided on the semiconductor layer of the switching elements Tr (see FIG. 4). The switching elements Tr as described above are of a bottom gate type but may be of a top gate type.

The common electrode CE is located on the second insulating layer 12. In FIG. 6, the common electrode CE faces the signal lines SGL with the third insulating layer 13 interposed therebetween. The third insulating layer 13 is made of an inorganic material having translucency, such as silicon oxide and silicon nitride.

The common electrode CE is covered by the third insulating layer 13. The third insulating layer 13 is formed by, for example, an inorganic material having translucency, such as silicon oxide and silicon nitride.

The pixel electrodes PE are located on the third insulating layer 13 and face the common electrode CE with the third insulating layer 13 interposed therebetween. The pixel electrodes PE and the common electrode CE are made of, for example, a conductive material having translucency, such as indium tin oxide (ITO) and indium zinc oxide (IZO). The pixel electrodes PE are covered by the first orientation film ALL The first orientation film AL1 also covers the third insulating layer 13.

The counter substrate SUB2 includes, as a base body, the second substrate 20 having translucency and an insulating property, such as a glass substrate and a resin substrate. The counter substrate SUB2 includes the light shielding layers BM, the color filters CFR, CFG, and CFB, an overcoat layer OC, and a second orientation film AL2 on the side of the second substrate 20 that faces the array substrate SUB1.

As illustrated in FIG. 6, the light shielding layers BM are located on the side of the second substrate 20 that faces the array substrate SUB1. As illustrated in FIG. 6, the light shielding layers BM define openings AP that respectively face the pixel electrodes PE. The light shielding layers BM are made of a resin material of black color or a metal material having a light shielding property.

The color filters CFR, CFG, and CFB are located on the side of the second substrate 20 that faces the array substrate SUB1, and end portions thereof overlap with the light shielding layers BM. As an example, the color filters CFR, CFG, and CFB are made of a resin material colored with blue, red, and green, respectively.

The overcoat layer OC covers the color filters CFR, CFG, and CFB. The overcoat layer OC is made of a resin material having translucency. The second orientation film AL2 covers the overcoat layer OC. The first orientation film AL1 and the second orientation film AL2 are made of, for example, a material exhibiting horizontal orientation performance.

The counter substrate SUB2 includes the light shielding layers BM and the color filters CFR, CFG, and CFB. The light shielding layers BM are arranged in a region facing wire portions including the scan lines GCL, the signal lines SGL, and the switching elements Tr illustrated in FIG. 3.

In FIG. 6, the counter substrate SUB2 includes the color filters CFR, CFG, and CFB of three colors. Alternatively, the counter substrate SUB2 may include color filters of four or more colors that include color filters of different colors from blue, red, and green, for example, white, clear, yellow, magenta, and cyan. The array substrate SUB1 may include these color filters CFR, CFG, and CFB.

The array substrate SUB1 and the counter substrate SUB2 described above are arranged such that the first orientation film AL1 and the second orientation film AL2 face each other. The liquid crystal layer LC is sealed into between the first orientation film AL1 and the second orientation film AL2. The liquid crystal layer LC is made of a negative liquid crystal material having a negative dielectric anisotropy or a positive liquid crystal material having a positive dielectric anisotropy.

The array substrate SUB1 faces the backlight 6 (see FIG. 1), and the counter substrate SUB2 is located on the display surface side. Various modes can be applied to the backlight 6, and explanation of the detail configuration thereof is omitted.

For example, when the liquid crystal layer LC is made of the negative liquid crystal material and in a state in which no voltage is applied to the liquid crystal layer LC, liquid crystal molecules LM are initially oriented in such a direction that long axes thereof are along a first direction Dx in a Dx-Dy plane illustrated in FIG. 4. On the other hand, in a state in which the voltage is applied to the liquid crystal layer LC, that is, in an ON state in which an electric field is formed between the pixel electrodes PE and the common electrode CE, the liquid crystal molecules LM receive influences of the electric field and orientation states thereof are changed. In the ON state, a polarization state of incident linearly polarized light is changed in accordance with the orientation states of the liquid crystal molecules LM when passing through the liquid crystal layer LC.

Then, the temperature detection wires SM will be described in detail. As illustrated in FIG. 4, each of the temperature detection wires SM includes a plurality of conductive thin wires 33, a first coupling wire 34a, and a second coupling wire 34b. One ends of the conductive thin wires 33 are electrically coupled to each other by the first coupling wire 34a, and the other ends of the conductive thin wires 33 are electrically coupled to each other by the first coupling wire 34a.

The conductive thin wires 33 are formed by a metal layer made of one or more elements selected from aluminum (Al), copper (Cu), silver (Ag), molybdenum (Mo), chrome (Cr), titanium (Ti), and tungsten (W). Alternatively, the conductive thin wires 33 are formed by a metal layer made of an alloy containing one or more elements selected from aluminum (Al), copper (Cu), silver (Ag), molybdenum (Mo), chrome (Cr), titanium (Ti), and tungsten (W). The conductive thin wires 33 can be made of, for example, an aluminum alloy such as AlNd, AlCu, AlSi, and AlSiCu. The conductive thin wires 33 may be a multilayer body formed by stacking a plurality of conductive layers made of the above-mentioned metal material or the alloy containing one or more of the above-mentioned materials.

A width Wsm of the conductive thin wires 33 (temperature detection wires SM) illustrated in FIG. 6 is a length orthogonal to the lengthwise direction and is, for example, preferably 1 μm to 10 μm, and more preferably in a range of 1 μm to 5 μm. When the width Wsm is 10 μm or smaller, the width Wsm can be made less than a width Wbm of the light shielding layers. This is preferable because the possibility that an aperture ratio is decreased is lowered. When the width Wsm is 1 μm or greater, the shapes of the conductive thin wires 33 (temperature detection wires SM) are made stable. This is also preferable because the possibility that the conductive thin wires 33 are decoupled is lowered.

First wires 37a are respectively coupled to the first coupling wires 34a. Second wires 37b are respectively coupled to the second coupling wires 34b. That is to say, in the first embodiment, the first wires 37a are coupled on the side of one ends of the temperature detection wires SM, and the second wires 37b are coupled on the side of the other ends thereof. The first wires 37a are provided along a peripheral region FR. The second wires 37b are provided along the peripheral region FR.

The first wire 37a and the second wire 37b coupled to one temperature detection wire SM are coupled to the different terminal portions 36. That is to say, the first wires 37a as one ends of the temperature detection wires SM and the second wires 37b as the other ends of the temperature detection wires SM are extended to the flexible substrate 72 with the terminal portions 36 interposed therebetween. The first wires 37a of the temperature detection wires SM and the second wires 37b of the temperature detection wires SM are electrically coupled to the resistance detection circuit 120 illustrated in FIG. 2 with the flexible substrate 72 interposed therebetween. In the resistance detection circuit 120, resistance change in accordance with temperature change is detected between the first wires 37a as one ends of the temperature detection wires SM and the second wires 37b as the other ends of the temperature detection wires SM.

The first wires 37a and the second wires 37b can be made of the same material as the metal material, the alloy, or the like that is used for the conductive thin wires 33. It is sufficient that the first wires 37a and the second wires 37b are made of a material having preferable conductivity, and a material differing from that of the conductive thin wires 33 may be used.

One ends of the conductive thin wires 33 are electrically coupled to each other by being coupled by the first coupling wires 34a. The other ends of the conductive thin wires 33 are electrically coupled to each other by being coupled by the second coupling wires 34b. The first wires 37a are electrically coupled to the first coupling wires 34a, and the second wires 37b are electrically coupled to the second coupling wires 34b. The display region AA in which the conductive thin wires 33 coupled by the first coupling wires 34a and the second coupling wires 34b are arranged corresponds to temperature detection regions of the temperature detection wires SM. With this configuration, the temperature detection wires SM can detect a partial heat generation state of the display region AA in a range of a predetermined area. Resistance values of the temperature detection wires SM are adjusted in accordance with the number of conductive thin wires 33.

The conductive thin wires 33 are arranged at positions overlapping with the light shielding layers BM in plan view. As illustrated in FIG. 5, the conductive thin wires 33 extend in the first direction along the light shielding layers BM. The planar shape of the conductive thin wires 33 is not limited to a linear metal thin wire shape. When the signal lines SGL have a zigzag shape or a wavy line shape, for example, the planar shape of the conductive thin wires 33 may be a zigzag shape or a wavy line shape along the shape of the signal lines SGL.

As illustrated in FIG. 4, the width of slits SP between the adjacent temperature detection wires SM in a second direction Dy is desirably the same as an interval between the adjacent conductive thin wires 33. The intervals of the conductive thin wires 33 are thereby made uniform in the plane, so that undesired diffraction light is reduced.

In FIG. 6, eight light shielding layers BM that do not overlap with the conductive thin wires 33 are formed between one light shielding layer BM that overlaps with the conductive thin wire 33 and another light shielding layer BM that overlaps with the conductive thin wire 33. Dummy conductive thin wires that are not electrically coupled to the first wires 37a and the second wires 37b may be provided, and the dummy conductive thin wires may be superimposed on the light shielding layers BM that do not overlap with the conductive thin wires 33.

Figure 8:
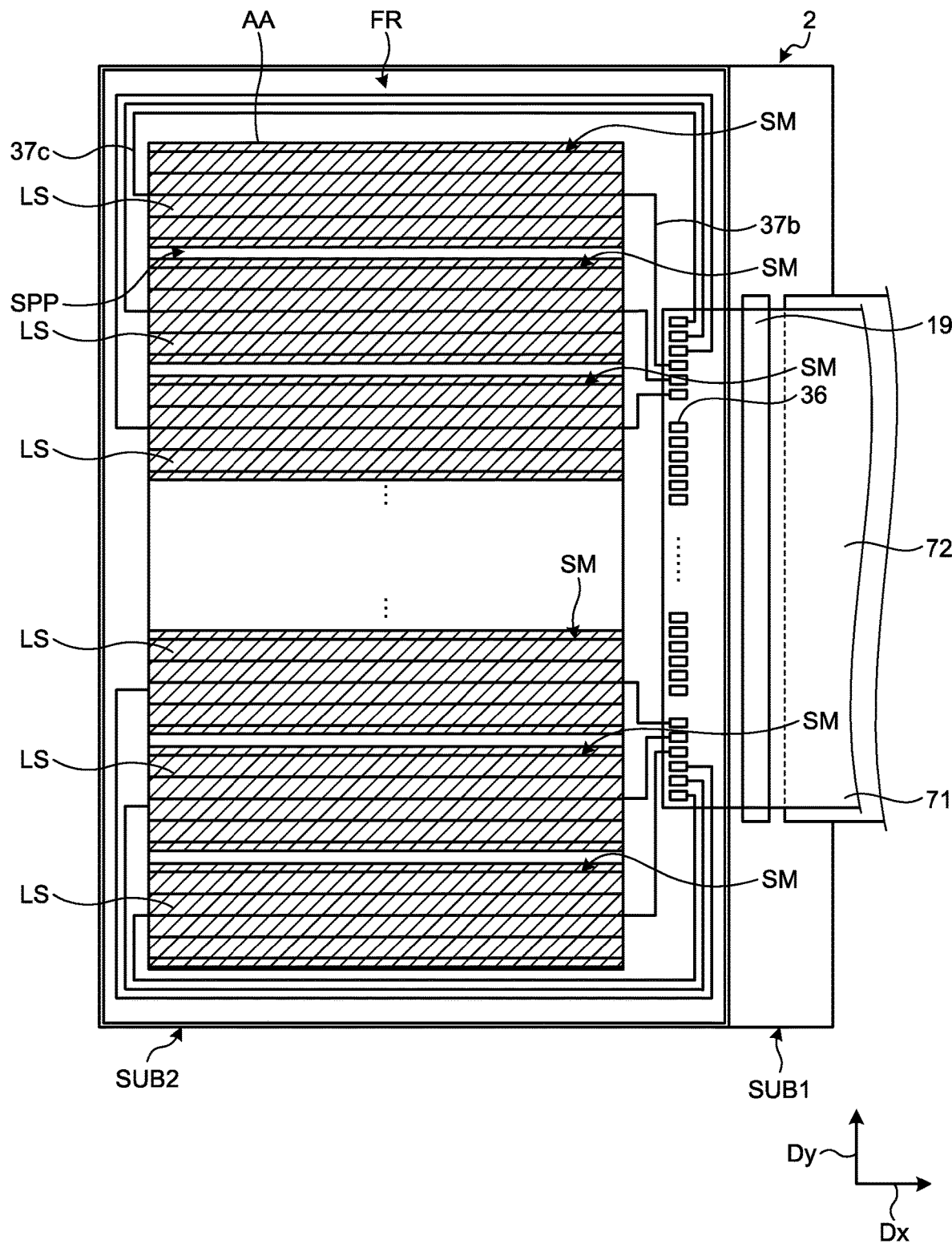
FIG. 8 is a plan view for explaining the light detection electrodes.

FIG. 8 is plan view for explaining the light detection electrodes. As illustrated in FIG. 8, the light detection electrodes LS are formed on substantially the entire surface of the second substrate 20 and are provided over the entire surface of the display region AA and the peripheral region FR. As illustrated in FIG. 8, the light detection electrodes LS are divided by slits SPP.

In the first embodiment, one light detection electrode LS overlaps with one temperature detection wire SM. The area of the light detection electrodes LS in plan view is larger than the total area of the temperature detection wires SM. The slits SP (see FIG. 4) between the adjacent temperature detection wires SM and the slits SPP (see FIG. 8) between the adjacent light detection electrodes LS overlap with each other in plan view.

In the first embodiment, third wires 37c are coupled on the side of one ends of the light detection electrodes LS and fourth wires 37d are coupled on the side of the other end thereof. The third wires 37c are provided along the peripheral region FR. The fourth wires 37d are provided along the peripheral region FR. The third wires 37c are not electrically coupled to the temperature detection wires SM. The fourth wires 37d are not electrically coupled to the temperature detection wires SM.

The third wire 37c and the fourth wire 37d coupled to one light detection electrode LS are coupled to the different terminal portions 36. That is to say, the third wires 37c as one ends of the light detection electrodes LS and the fourth wires 37d as the other ends of the light detection electrodes LS are extended to the flexible substrate 72 with the terminal portions 36 interposed therebetween. The third wires 37c of the light detection electrodes LS and the fourth wires 37d of the light detection electrodes LS are electrically coupled to the resistance detection circuit 120 illustrated in FIG. 2 with the flexible substrate 72 interposed therebetween. In the resistance detection circuit 120, resistance change in accordance with a light amount is detected between the third wires 37c as one ends of the light detection electrodes LS and the fourth wires 37d as the other ends of the light detection electrodes LS.

The third wires 37c and the fourth wires 37d can be made of the same material as the conductive material that is used for the light detection electrodes LS or the material that is used for the conductive thin wires 33. It is sufficient that the light detection electrodes LS are made of a material having preferable conductivity, and a material differing from those of the light detection electrodes LS and the conductive thin wires 33 may be used therefor.

As described above, the display device 2 in the first embodiment includes the substrate having the display region AA, the temperature detection wires SM, and the light detection electrodes LS. The temperature detection wires SM are arranged at positions overlapping with the display region AA in plan view. The light detection electrodes LS overlap with the temperature detection regions of the temperature detection wires. With this configuration, light of sunlight LL and the partial heat generation state of the display region AA can be detected in the temperature detection regions of the temperature detection wires SM.

In the first embodiment, conductive layers 331 are formed on the second substrate 20. Conductive layers 332 are formed on the conductive layers 331. The protection layer 38 is formed on the conductive layers 331 and the conductive layers 332. The protection layer 38 is made of translucent resin having an insulating property, such as acrylic resin. The light detection electrodes LS are formed on the protection layer 38. In other words, the temperature detection wires SM and the light detection electrodes LS are provided above the second substrate 20 and the temperature detection wires SM are stacked below the light detection electrodes LS.

The resistances of the light detection electrodes LS are lowered when they are irradiated with the sunlight LL. On the other hand, the temperatures of the temperature detection wires SM are increased and the resistances thereof are increased when they are irradiated with the sunlight LL.

The light detection electrodes LS overlap with the temperature detection regions of the temperature detection wires SM in plan view. The resistance detection circuit 120 cannot therefore detect the resistance change accurately when the light detection electrodes LS and the temperature detection wires SM are electrically coupled to each other. To cope with this, in the first embodiment, the light detection electrode LS and the temperature detection wires SM are insulated from each other with the protection layer 38. With this configuration, the resistance detection circuit 120 can detect the resistance change rates in accordance with change in the light amount of the light detection electrodes LS.

Furthermore, the resistance detection circuit 120 can detect the resistance change rates in accordance with change in the temperatures of the temperature detection regions of the temperature detection wires SM.

The light detection electrodes LS are made of, for example, one or more materials selected from ITO, indium zinc oxide (IZO), and SnO.

The conductive layers 331 may be multilayer bodies in which at least two or more metal layers made of one or more elements selected from aluminum (Al), copper (Cu), silver (Ag), molybdenum (Mo), chrome (Cr), titanium (Ti), and tungsten (W), and a metal layer made of an alloy containing any of these elements are stacked. Similarly, the conductive layers 332 may be multilayer bodies in which at least two or more metal layers made of one or more elements selected from aluminum (Al), copper (Cu), silver (Ag), molybdenum (Mo), chrome (Cr), titanium (Ti), and tungsten (W), a metal layer made of an alloy containing any of these elements, an oxide film containing tin oxide ($SnO_2$) and silicon dioxide ($SiO_2$) as main components, and an oxide layer containing gallium oxide ($Ga_2O_3$), indium oxide ($In_2O_3$), and tin oxide ($SnO_2$) as main components are stacked.

A material causing light reflection that is less than that by conductive layers 331 is selected for the conductive layers 332. Accordingly, the visible light reflectivity of the conductive layers 332 is lower than the visible light reflectivity of the conductive layer 331, and the conductive layers 332 are closer in color to black than the conductive layers 331. A resistance value of the conductive layers 332 is increased in order to make them closer to black than the conductive layers 331. Accordingly, a material having higher conductivity than that of the conductive layers 332 is selected for the conductive layers 331. Increase in power consumption in the temperature detection wires SM can thereby be reduced.

Measurement of Temperature

Figure 9:
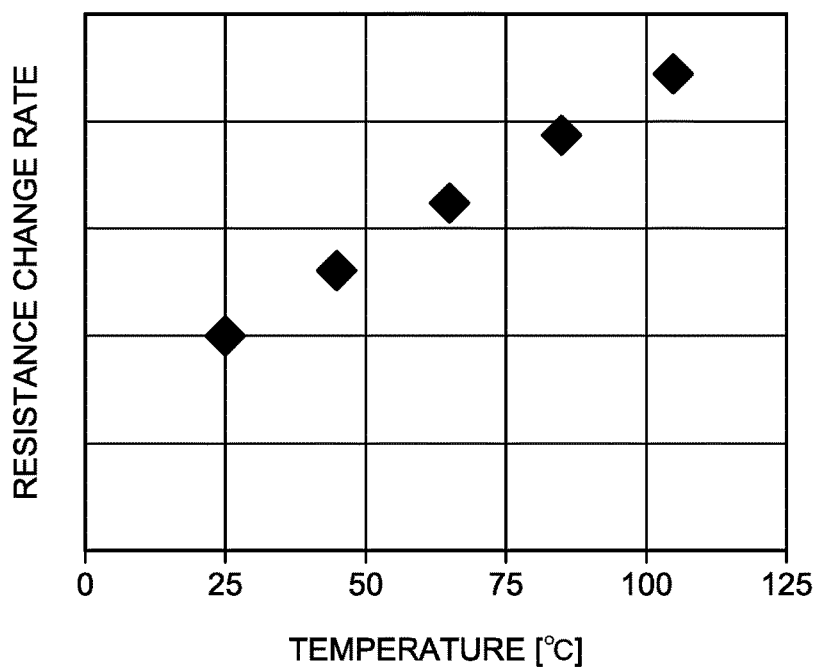
FIG. 9 illustrates a resistance change rate of one temperature detection wire to a temperature thereof.
Figure 10:
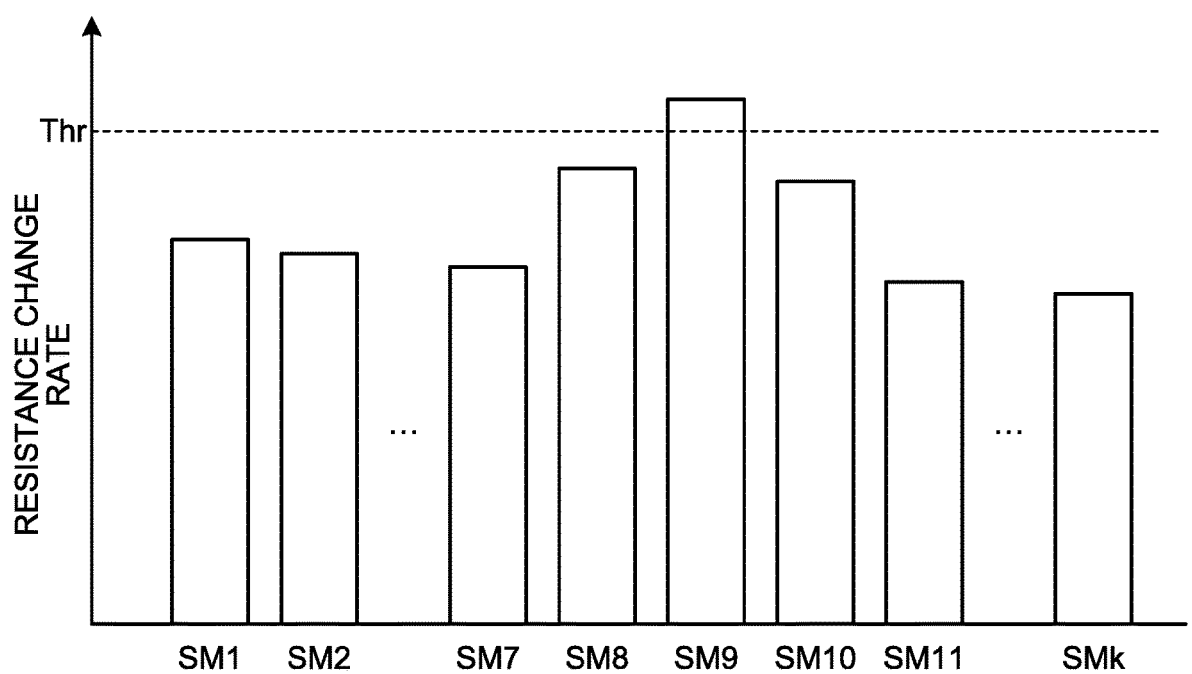
FIG. 10 is a descriptive view for explaining an example of distribution of the resistance change rates of the temperature detection wires.
Figure 11:
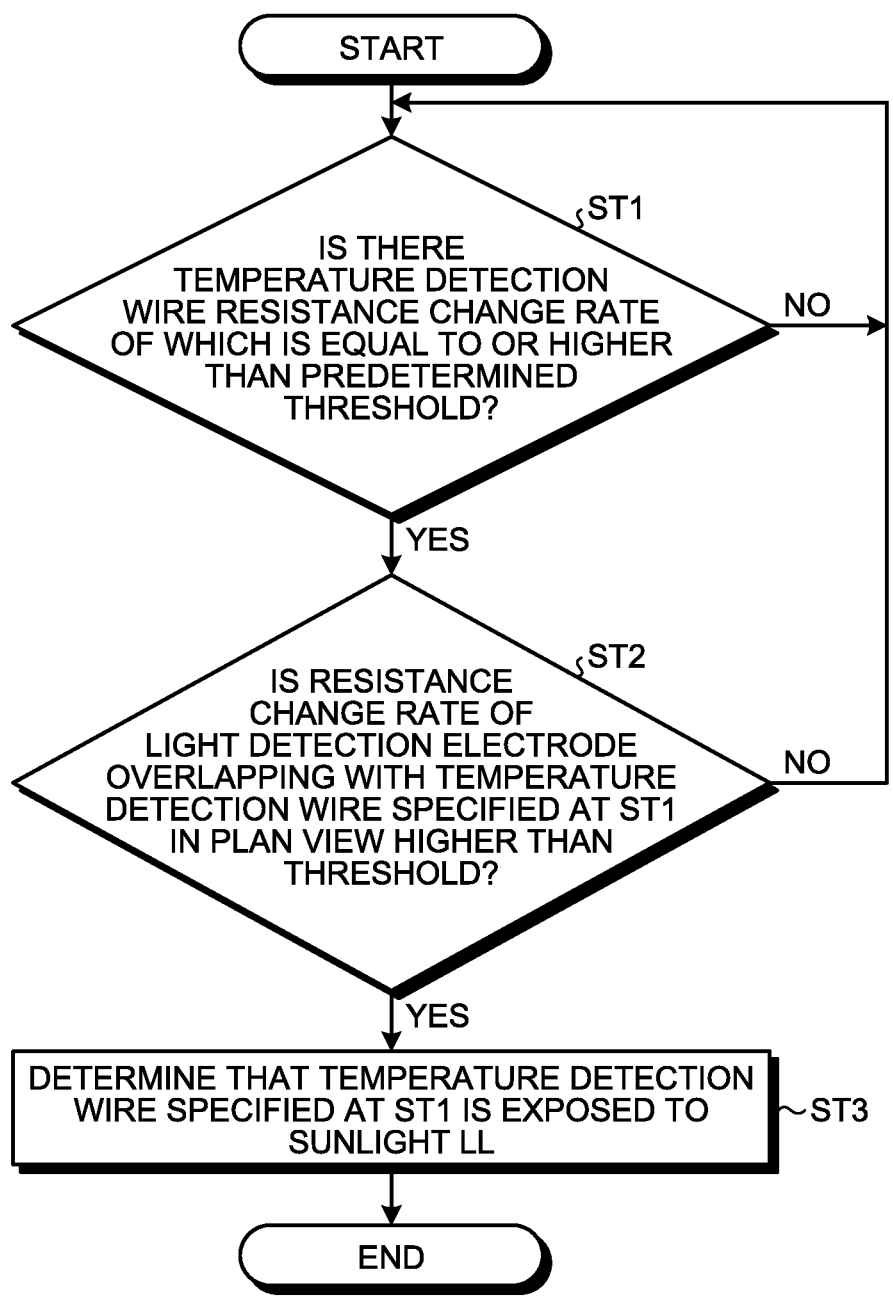
FIG. 11 is a flowchart for explaining an example of determination procedures of a partial heat generation state of a display region.

FIG. 9 illustrates the resistance change rate of one temperature detection wire to the temperature thereof. FIG. 10 is a descriptive view for explaining an example of distribution of the resistance change rates of the temperature detection wires. FIG. 11 is a flowchart for explaining an example of determination procedures of the partial heat generation state of the display region. As illustrated in FIG. 9, the resistance change rate of the temperature detection wire SM with reference to a resistance value of a reference temperature, for example, linearly changes depending on temperatures.

As illustrated in FIG. 1, in the HUD device 1, the sunlight LL can be incident on an opening 4S of the housing 4 depending on a relative position of sun SUN. The sunlight LL is guided by the optical system RM, is condensed as is closer to the display device 2, and strikes on a part of the display region in some cases. The condensed sunlight possibly deteriorates the display device, and it is therefore desired that a partial heat generation state of the display region is detected.

In the first embodiment, as illustrated in FIG. 4, the temperature detection wires SM are arrayed at the positions overlapping with the display region AA in plan view. When there is the temperature detection wire SM the temperature of which is increased, the position of the display region AA exposed to the sunlight LL can be grasped.

For example, in FIG. 4, it is assumed that the temperature detection wires SM of the temperature detection wire SM1 to the temperature detection wire SMk illustrated in FIG. 10 are arrayed in the Dy direction in the display region AA. The resistance detection circuit 120 illustrated in FIG. 2 performs AD conversion on the resistances of the temperature detection wire SM1 to the temperature detection wire SMk and outputs resistance detection signals to the control circuit 110.

As illustrated in FIG. 11, the control circuit 110 detects the resistance change rates of the temperature detection wires SM1 to SMk. When there is no temperature detection wire the resistance change rate of which is equal to or higher than a predetermined threshold Thr (No at step ST1), the control circuit 110 continues detection of the resistance change rates of the temperature detection wires SM1 to SMk.

When there is the temperature detection wire SM9 the resistance change rate of which is equal to or higher than the predetermined threshold Thr (Yes at step ST1), the control circuit 110 detects the resistance change rate of the light detection electrode overlapping with the temperature detection wire SM9 specified at step ST1 in plan view. When the resistance change rate of the light detection electrode overlapping with the temperature detection wire SM9 specified at step ST1 in plan view is not higher than the threshold (No at step ST2), the control circuit 110 continues detection of the resistance change rates of the temperature detection wires SM1 to SMk.

When the resistance change rate of the light detection electrode overlapping with the temperature detection wire SM9 specified at step ST1 in plan view is higher than the threshold (Yes at step ST2), the control circuit 110 determines that the temperature detection wire SM9 specified at step ST1 is exposed to the sunlight LL (step ST3).

The control circuit 110 can detect temperature increase due to the sunlight LL condensed by the optical system RM while distinguishing it from temperature increase of a surrounding environment.

When the temperature detection wires SM are exposed to the sunlight LL, the sunlight LL can be reflected by the temperature detection wires SM. As illustrated in FIG. 1, even when a mounting position of the display device 2 is adjusted so as to prevent regularly reflected light of the sunlight LL from returning to the window shield WS, there is the possibility that diffraction light generated in the conductive thin wires 33 reaches the window shield WS.

Figure 7:
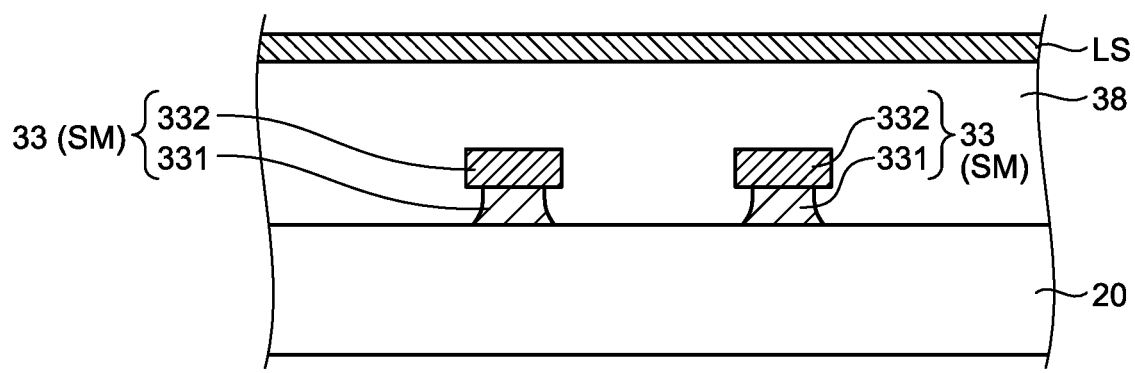
FIG. 7 is a schematic enlarged cross-sectional view for explaining the temperature detection wires and light detection electrodes.

As illustrated in FIG. 7, in the display device 2, the temperature detection wires SM are arranged at positions overlapping with the second substrate 20 having the display region in the display region AA in plan view. The temperature detection wires SM include the first conductive layers 331 stacked above the second substrate 20 and the second conductive layers 332 stacked on the first conductive layers 331. The visible light reflectivity of the second conductive layers 332 is lower than the visible light reflectivity of the first conductive layer 331. With this configuration, even when the temperature detection wires SM are exposed to the sunlight LL, the diffraction light on the temperature detection wires SM is reduced. As a result, display quality of the image VI that is recognized in the field of view of the user H illustrated in FIG. 1 is improved.

As illustrated in FIG. 7, the second conductive layers 332 have a larger width than the first conductive layers 331 does. With these widths, even when the first conductive layers 331 reflect the sunlight LL, the second conductive layers 332 cover the light, so that the diffraction light on the temperature detection wires SM is reduced.

Second Embodiment

Figure 12:
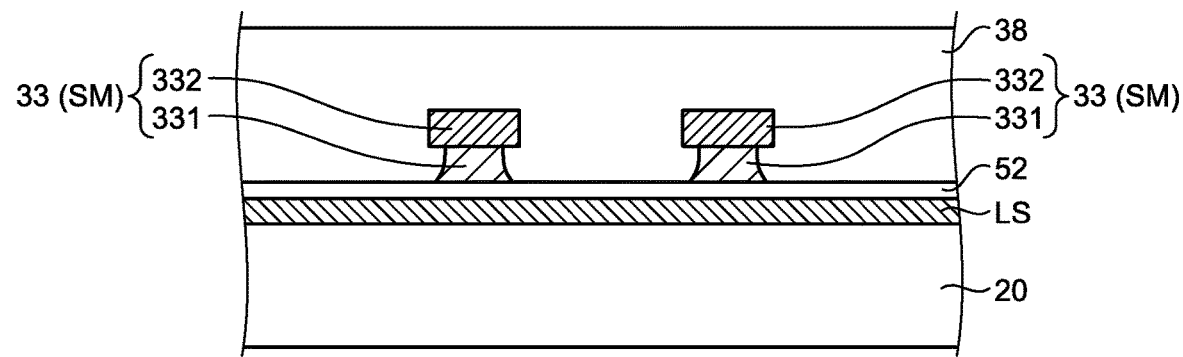
FIG. 12 is a schematic enlarged cross-sectional view for explaining temperature detection wires and light detection electrodes according to a second embodiment.

FIG. 12 a schematic enlarged cross-sectional view for explaining temperature detection wires and light detection electrodes according to a second embodiment. The same reference numerals denote the same components described in the above-mentioned first embodiment and overlapped explanation thereof is omitted.

In the second embodiment, an insulating layer 52 is formed on the light detection electrode LS. The conductive layers 331 are formed on the insulating layer 52. The conductive layers 332 are formed on the conductive layers 331. With this configuration, the light detection electrode LS and the above-mentioned conductive thin wires 33 are insulated from each other with the insulating layer 52. In other words, the temperature detection wires SM are stacked above the light detection electrode LS with the insulating layer 52 interposed therebetween.

In the second embodiment, the light detection electrode LS and the temperature detection wires SM are insulated from each other with the insulating layer 52. With this configuration, the resistance detection circuit 120 can detect the resistance change rates in accordance with change in the light amount of the light detection electrode LS. Furthermore, the resistance detection circuit 120 can detect the resistance change rates in accordance with change in the temperatures of the temperature detection regions of the temperature detection wires SM.

Third Embodiment

Figure 13:
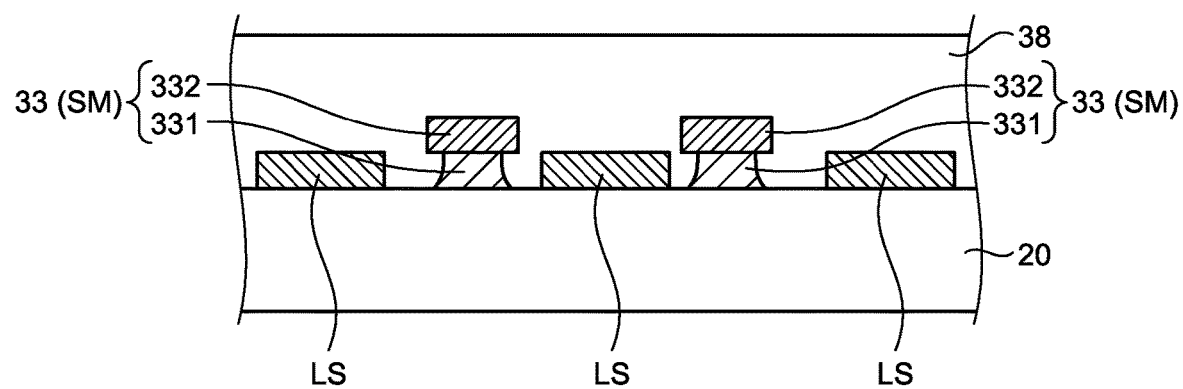
FIG. 13 is a schematic enlarged cross-sectional view for explaining temperature detection wires and light detection electrodes according to a third embodiment.

FIG. 13 a schematic enlarged cross-sectional view for explaining temperature detection wires and light detection electrodes according to a third embodiment. The same reference numerals denote the same components described in the above-mentioned first embodiment and second embodiment and overlapped explanation thereof is omitted.

In the third embodiment, the light detection electrodes LS are formed in the same layer as the conductive thin wires 33. The light detection electrodes LS are formed between the adjacent conductive thin wires 33 and they are insulated from each other with the protection layer 38. In other words, the light detection electrodes LS and the temperature detection wires SM are formed in the same layer on the second substrate 20.

In the third embodiment, the light detection electrodes LS and the temperature detection wires SM are insulated from each other with the protection layer 38. With this configuration, the resistance detection circuit 120 can detect the resistance change rates in accordance with change in the light amount of the light detection electrodes LS. Furthermore, the resistance detection circuit 120 can detect the resistance change rates in accordance with change in the temperatures of the temperature detection regions of the temperature detection wires SM.

Other effects provided by the aspect described in the first embodiment that are obvious from the present disclosure or at which those skilled in the art can appropriately arrive should be interpreted to be provided by the present invention.

Although the preferred embodiments have been described above, the present disclosure is not limited by these embodiments. Contents disclosed in the embodiments are merely examples and various modifications can be made in a range without departing from the gist of the present disclosure. It is needless to say that appropriate modifications in a range without departing from the gist of the present disclosure belong to the technical range of the present disclosure.

For example, although the light detection electrodes LS are divided by the slits SPP, the light detection electrode LS may be a solid film covering the display region AA by one material having translucency and conductivity without forming the slits SPP.

For example, although the display device 2 is the liquid crystal panel, the display device 2 may be an organic EL panel. The display device 2 may be a micro LED that displays an image by outputting different light from each light emitting element LED. The light emitting element LED has a size of approximately 3 μm to 100 μm in plan view.

What is claimed is:

1. A display device comprising:
a substrate having a display region;
a plurality of temperature detection wires arranged at positions overlapping with the display region in plan view; and
a light detection electrode overlapping with temperature detection regions of the temperature detection wires in plan view.

2. The display device according to claim 1, wherein
one end of each of the temperature detection wires is coupled to a first wire, the other end of each of the temperature detection wires is coupled to a second wire, and resistance that changes in accordance with temperature change is detected between the first wire and the second wire, and
one end of the light detection electrode is coupled to a third wire, the other end of the light detection electrode is coupled to a fourth wire, and resistance that changes in accordance with a light amount is detected between the third wire and the fourth wire.

3. The display device according to claim 1, wherein the light detection electrode is made of a material having translucency and conductivity.

4. The display device according to claim 2, wherein the light detection electrode is made of a material having translucency and conductivity.

5. The display device according to claim 1, wherein the temperature detection wires are stacked above or below the light detection electrode.

6. The display device according to claim 2, wherein the temperature detection wires are stacked above or below the light detection electrode.

7. The display device according to claim 3, wherein the temperature detection wires are stacked above or below the light detection electrode.

8. The display device according to claim 1, wherein the temperature detection wires are formed in a same layer as the light detection electrode.

9. The display device according to claim 2, wherein the temperature detection wires are formed in a same layer as the light detection electrode.

10. The display device according to claim 3, wherein the temperature detection wires are formed in a same layer as the light detection electrode.

* * * * *